Nov. 12, 1963 V. L. DOWNING 3,110,643
METHOD OF MANUFACTURE OF A LAMINATED METAL AND WOOD PRODUCT
Filed Oct. 10, 1960
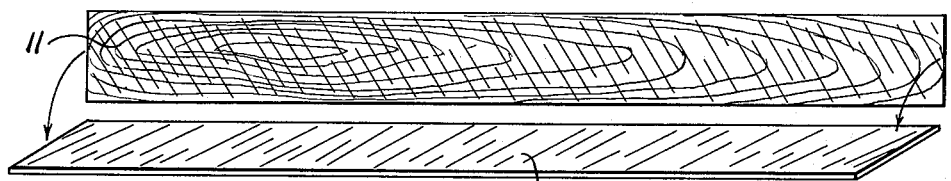
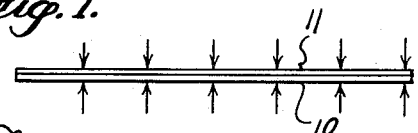
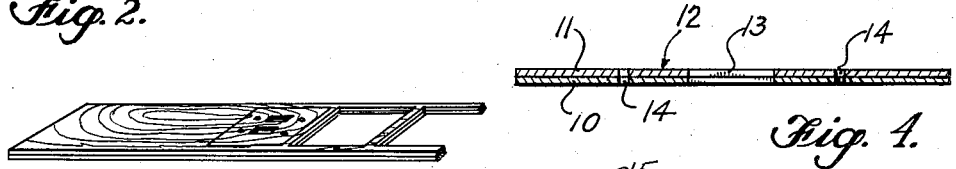
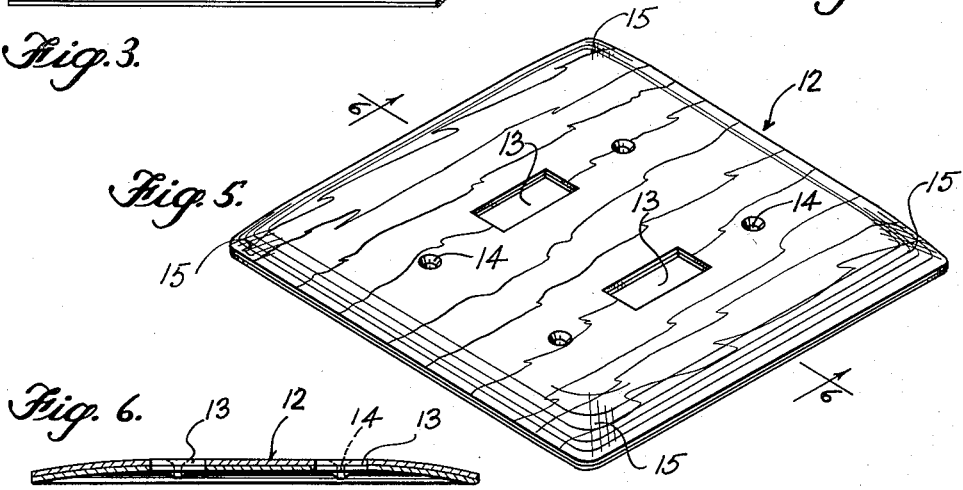
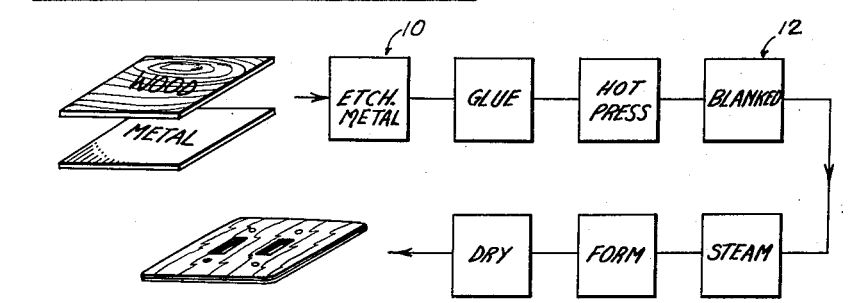
INVENTOR.
VERLAN L. DOWNING
BY
ROBINSON & BERRY
ATTORNEYS _
United States Patent Office 3,110,643
Patented Nov. 12, 1963

3,110,643
METHOD OF MANUFACTURE OF A LAMINATED METAL AND WOOD PRODUCT
Verlan L. Downing, Seattle, Wash., assignor to Elliott Bay Lumber Company, Seattle, Wash., a co-partnership
Filed Oct. 10, 1960, Ser. No. 61,414
5 Claims. (Cl. 156—222)

This invention relates to a novel method of forming certain products from laminated material which includes metal plates which are adhesively bonded to wood veneers. More particularly, the invention has reference to the method of producing articles wherein sheet metal plates are laminated with wood veneer and blanks are die stamped from the laminates and the blanks are steamed and subjected to press shaping operations that includes the compound bending of the laminated blanks.

It being one of the primary objects of this invention to provide a practical method that makes possible the compound bending of veneer covered metal plates without damage to the wood veneer and without breaking the glue bond between the plates and their veneer facings.

Another object of the invention resides in the novel articles of manufacure that are produced in accordance with the present method.

Further objects reside in the steps followed in the carrying out of the present invention and in their particular sequences in the making of an article of this invention as herein disclosed.

In carrying out the present invention, I have provided the novel sequence of steps necessary to produce the article of manufacture shown in the accompanying drawings, wherein:

FIG. 1 is a perspective view of a strip of sheet metal and a strip of wood veneer as prepared and placed in readiness for joining them adhesively.

FIG. 2 is a view illustrating, in side elevation, the assembly of the metal and veneer strips for adhesive joining under pressure applied against their top and bottom surfaces.

FIG. 3 is a fragmental perspective view of a portion of the adhesively joined metal and veneer strips, as punched, to separate blanks to be formed into the present article of manufacture therefrom.

FIG. 4 is an enlarged cross-sectional view of a blank as punched from the adhesively joined strips of FIG. 3.

FIG. 5 is a perspective view of an electrical outlet box cover plate that is produced by the method of this invention.

FIG. 6 is a cross-sectional view of the die shaped plate taken on line 6—6 in FIG. 5.

FIG. 7 is a view schematically showing the sequence of steps followed in the production of the present veneer covered electrical outlet box cover plate.

It is acknowledged that it is old to mold or form various wood forms by the utilization of steam and moisture and various types of pressures. However, these have required substantial time and equipment and are not accomplished almost instantaneously on a mass production basis with equipment such as a punch press.

Also, it is not the intent to imply, by the present drawings, that the invention is limited to the making of outlet box cover plates; that particular article having been illustrated herein because it is typical of various articles that may be produced by following the steps herein disclosed for the making of articles comprising metal plates that are laminated with wood veneer, and are then subjected to compound bending, shaping or forming.

In carrying out the manufacture of such articles, as that shown, it is preferred that strips of sheet metal, such as aluminum, steel, or the like, be used; such a strip being designated by numeral 10 in FIG. 1. Paired with the metal strip 10 is a wood veneer strip 11 of substantially the same length and width. For the making of the article shown in FIG. 5, the metal strips would preferably have a thickness of approximately 1/16 inch. Aluminum strips are preferred because of their resistance to rust and their general adaptability to this particular manufacturing treatment and use. After being provided, in suitable dimensions, the aluminum strip 10 is given a known and presently employed chemical etching treatment that gives it a desired surface porosity and surface texture that insures a better adhesive bond between the plate and veneer.

The prepared wood veneer strip 11 is cut to the desired length, width and thickness. The thickness is approximately 1/48 inch. A thermo-setting film of resin glue is applied to the surface of the metal plate 10 and veneer strip 11 that are to be joined. The glue is permitted to dry and the strips are then placed one upon the other as in FIG. 2 and subjected to joining pressure by passing the assembled strips through squeeze rolls to produce a contact bond. A plurality of bonded strips are then placed in a hot press and pressed at approximately 250° F. for ten minutes. The press platens are then separated sufficiently for escape of gas and are again closed for ten minutes. The lamination, provided by the adhesively joined strips is then passed through a punch press or the like and the blanks 12 from which the present cover plates are formed, are punched therefrom. In this punching out operation, the blanks 12 may be simultaneously or subsequently formed with openings as at 13 in FIG. 5 for acommodation of the switch levers and also with holes, as at 14, for reception of the plate attaching screws.

In order to prepare the blanks 12 for compound bending without destroying the adhesive bond and without damage to the wood veneer portions they are subjected to a controlled steaming treatment. This treatment prepares the veneer for the necessary stretching, shrinking and compressing without that damage thereto that without the treatment, would either break the adhesive bond between plate and veneer or crack the veneer. Steaming is effected by conveying the lamination through a steam tunnel during a controlled admittance of steam and rate of conveyor travel. This steam treatment raises the temperature of the metal and wood veneer; it softens the wood and causes it to absorb that required amount of moisture that permits bending, drawing and compressing of the adhesively joined veneer strip without cracking, discoloration or damage to the adhesive bond.

The steamed blanks are then placed individually in the forming press between upper and lower forming dies and are subjected to pressure that simultaneously draws both the wood and metal and forms the four bonding edge portions thereof downwardly, as has been shown in FIG. 6. In this operation, the corner portions of the article, such as designated in FIG. 5 by reference numeral 15, are subjected to compound forming whereby the veneer sheets are subjected to stretching, bending and compression, all of which is accomplished without cracking the wood or breaking or otherwise damaging the glue bond. The drawing of the wood and metal increases the length of the curved areas approximately 1/8 of an inch in a distance of 7/8 of an inch. During the same forming operation, it is also possible to form the conically shaped depressions surrounding the holes 14.

There are numerous commercial adhesives which can be satisfactorily used as a bonding agent to join the metal and veneer. I prefer to use a thermosetting, contact bond adhesive. The thickness of the adhesive coating is a critical element in producing a satisfactory product. I have found that a film of approximately 2 millimeters on each of the joined surfaces to be adequate for obtaining the desired results. If the film is too thick, it will cause discoloration on the exposed surface of the thin veneers. If the film is too thin, it will not produce the required adhesion.

The time interval required to process the blank is one of the critical requirements in carrying out the method, and the rapid, mass production is one of the important advantages. The period of time in the steam chamber may be altered slightly depending upon the types of veneer being processed. The average blank is in the steam chamber for less than 30 seconds. During this period of time the veneer will absorb the required moisture to permit the desired forming. Also the aluminum plate will be heated. The amount of moisture can be controlled by either the quantity of steam or the time element or both. After the desired steaming and moisture absorption, the blank is immediately placed in the forming die and formed to the prescribed shape. The formed article is then immediately placed in a drying chamber and the complete drying is accomplished in approximately 30 seconds. Thus, the complete steaming, forming and drying takes place in approximately one minute. There is an inherent advantage in the drying that results from the veneer bond to the metal. The heated metal plate supplements the heat provided in the drying chamber. It is a definite requirement to limit the moisture absorption as much as possible and still make possible the desired results. Excessive moisture will discolor the veneers due to the release of the tannic acid in the wood.

The forming of the objects or articles as herein described has the advantage that the bonded metal holds the pliable veneer in the desired shape until the veneer is dried. If the veneer was not so bonded, it would be necessary to completely dry the veneer before it is removed from the forming die. This would make it impractical to produce articles on a mass production basis. Therefore, the metal bonded to the veneers serves two functions. It adds strength and rigidity to the finished product and it acts as a holding element to retain the moist veneers in the desired shape until the veneers are dry.

It is believed to be readily apparent that the method herein described may be utilized in producing numerous products and merely for purposes of illustration, I have shown and described a simple cover plate which includes compound curves that require stretching or drawing of the veneer in two directions as well as compression of the fibers at the corners.

What I claim as new is:

1. The method of forming a laminated metal and wood product comprising, providing a sheet of metallic material having a thickness of approximately $\frac{1}{16}$ inch and a sheet of wood having a thickness of approximately $\frac{1}{48}$ inch, providing a coating of thermosetting resinous contact bond adhesive of a thickness of approximately two millimeters on one surface of each of said sheets, placing said coated surfaces in contact with one another and applying pressure and heat to the sheets to permanently bond the sheets together, forming a blank from the laminated material, subjecting said blank to a controlled steaming treatment to raise the temperature of the laminated blank to soften the wood and cause it to absorb that required amount of moisture that permits bending, drawing and compressing of the wood without cracking, discoloration, and damage to the adhesive bond, immediately placing the heated and moisture-laden blank in a forming die having compound curved surfaces, applying pressure through the intermediary of said forming die so as to simultaneously draw both the wood and metal and subject the wood sheet to stretching, bending and compression, all of which is accomplished without cracking the wood or breaking or otherwise damaging the bond, and then drying the formed product.

2. The method as defined in claim 1, wherein the step of applying pressure and heat to the sheets to permanently bond the sheets together is performed by pressing the two sheets together in a hot press at approximately 250° F.

3. The method as defined in claim 1, wherein the blank is subjected to the controlled steaming treatment for approximately 30 seconds.

4. The method as defined in claim 1, wherein the formed product is dried for a period of approximately 30 seconds.

5. The method as defined in claim 1, wherein the steaming, forming and drying of the product are performed in approximately one minute.

References Cited in the file of this patent

UNITED STATES PATENTS

| 533,435 | Campbell | Feb. 5, 1895 |
| 536,841 | Roenigk | Apr. 2, 1895 |

FOREIGN PATENTS

| 599,934 | Great Britain | Mar. 24, 1948 |